United States Patent [19]
Vollenweider

[11] Patent Number: 5,865,085
[45] Date of Patent: Feb. 2, 1999

[54] HIGH VOLUME WIRE STRIPPER

[76] Inventor: Eric Vollenweider, 944 Lincoln Blvd., Bridgeport, Conn. 06606

[21] Appl. No.: 769,608

[22] Filed: Dec. 16, 1996

Related U.S. Application Data

[63] Continuation-in-part of Ser. No. 439,883, May 12, 1995, abandoned.

[51] Int. Cl.$^6$ .............................. B26D 3/08; B26D 7/06; H02G 1/12
[52] U.S. Cl. ............................... 83/861; 83/105; 83/165; 83/425.3; 83/444; 83/947; 81/9.51
[58] Field of Search .............................. 83/505, 346, 825, 83/444, 743, 425.3, 947, 165, 105, 861; 81/9.51; 30/90.9, 90.8

[56] References Cited

U.S. PATENT DOCUMENTS

| | | | |
|---|---|---|---|
| 2,521,688 | 9/1950 | Catalog | 81/9.51 |
| 2,548,977 | 4/1951 | Jaeger | 30/90.9 |
| 2,648,899 | 8/1953 | Beyer | 30/90.9 |
| 2,873,489 | 2/1959 | Hirschhorn | 29/33 K |
| 3,044,170 | 7/1962 | Aqombar | 30/91 |
| 3,309,947 | 3/1967 | Denney | 81/9.51 |
| 3,316,781 | 5/1967 | Bignell | 81/9.51 |
| 3,377,891 | 4/1968 | Horrocks | 81/9.5 |
| 3,379,598 | 4/1968 | Petru | 83/444 |
| 3,641,852 | 2/1972 | Terada | 81/9.51 |
| 3,990,331 | 11/1976 | Matthews | 81/9.5 R |
| 4,538,491 | 9/1985 | Henneuse | 83/444 |
| 4,577,405 | 3/1986 | Butler | 30/90.1 |
| 4,631,059 | 12/1986 | Wolvek et al. | 30/90.8 |
| 4,754,962 | 7/1988 | Kontz | 83/152 |
| 4,947,549 | 8/1990 | Genovese et al. | 30/90.8 |
| 4,966,060 | 10/1990 | Poloni | 83/444 |
| 5,050,302 | 9/1991 | Mills | 30/90.8 |
| 5,095,792 | 3/1992 | Moody | 83/444 |
| 5,414,931 | 5/1995 | Wollerman | 81/9.51 |
| 5,580,008 | 12/1996 | Koegler et al. | 83/505 |
| 5,695,105 | 12/1997 | Ohara | 83/346 |

FOREIGN PATENT DOCUMENTS

| | | | |
|---|---|---|---|
| 127379 | 12/1946 | Sweden | 30/90.9 |
| 133412 | 10/1951 | Sweden | 30/90.9 |
| 627237 | 8/1949 | United Kingdom | 30/90.9 |

OTHER PUBLICATIONS

Photocopy entitled Muscle by Triple/s Dynamics, Inc. of Dallas Texas, PB1–R5/91–1 M.
Photocopy of "CS201 Cable Stripper" by Gerisco of Lithinia, GA.

*Primary Examiner*—Rinaldi I. Rada
*Assistant Examiner*—Sean Pryor

[57] ABSTRACT

An improved apparatus for removing surrounding insulation from an insulated electrical conductor has a pair of matched frustoconical cutter wheels mounted on a cutter shaft. The cutter wheels incorporate a cutter edge and a beveled outer slope. The cutter wheels are spaced apart by an interchangeable cutter spacer. When properly set up the cutter spacer is of a size so that the cutter wheels flank the conductor of the wire being stripped, cutting only the insulation portion of the wire. The cutter edges pierce and cut the insulation while the slope of the cutter wheels urge the insulation away from the conductor. A pinch roller assembly stabilizes the wire as it passes by the cutter wheels. A diverter is mounted in close proximity to the cutter spacer in a tangential fashion to divert and clear away any insulation that clings to the cutter spacer during operation.

7 Claims, 10 Drawing Sheets

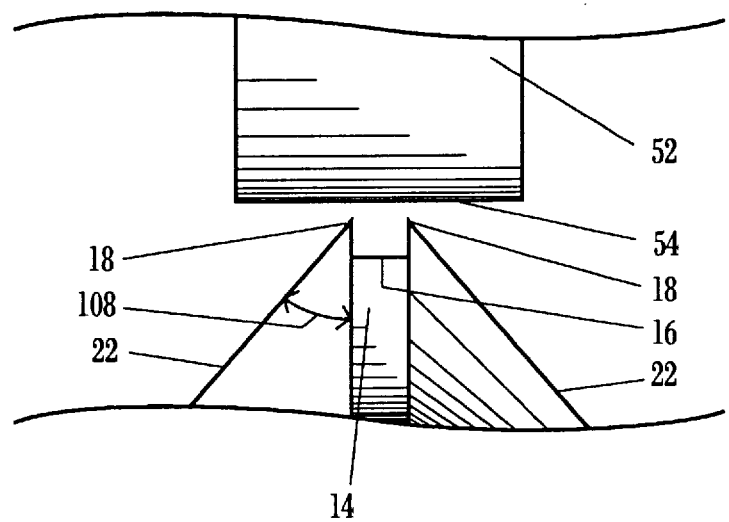
FIGURE 6-A
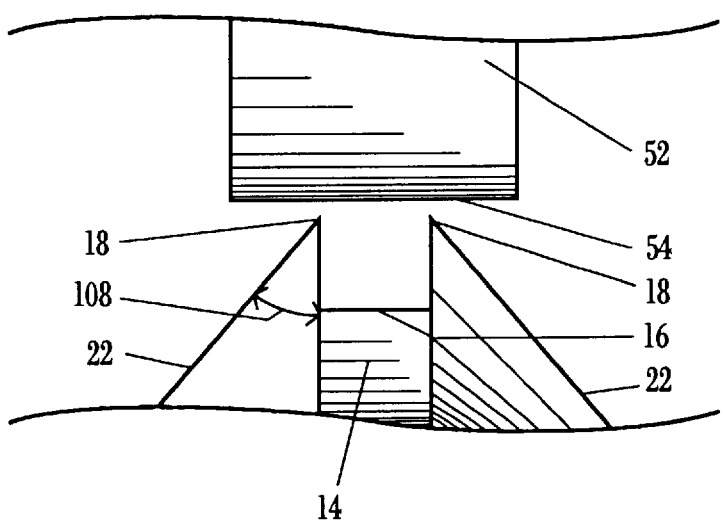
FIGURE 6-B

HIGH VOLUME WIRE STRIPPER

This is a continuation-in-part of U.S. application Ser. No. 08/439,883, filed May 12, 1995, now abandoned.

BACKGROUND—FIELD OF INVENTION

The present invention relates to the tools and apparatus involved with stripping wire, and more particularly the removal of the insulation jacket around a solid or braided electrical conductor.

BACKGROUND—DESCRIPTION OF PRIOR ART

Wire manufacturers are commonly confronted with defective or reject wire. While the conductor itself may be fine, the insulation or "jacket" on the wire is usually the problem. Common reject wire characteristics include: blistered or bubbled jacket, incorrect or blurred markings or wrong color. All of these problems require that the reject wire be stripped or scrapped and the metal conductor reclaimed for remanufacture. Unfortunately, the stripping processes used tend to nick or scar the conductor requiring that the reclaimed conductor be smelt rather than reused.

Smaller wire manufacturers are known to sell off the reject wire to scrap yards. The scrap yards in turn either resell the wire to larger scrap yards specially equipped with "Chopper/Separators (see photocopy entitled "Muscle" by Triple/S Dynamics, Inc. of Dallas Tex., PB1 R5/91-1M). or bail and bundle it up and sell it overseas where it is processed.

Larger wire manufacturers that produce large amounts of reject wire usually have pick-up arrangements with chopper/separator facilities. The chopper/separator facility will pick-up and process the reject wire for a certain price per pound. The conductor portion of the wire is returned to the manufacturer where it is smelt, while the plastic insulation ends up in landfills. The plastic retrieved from this process is usually too contaminated with metal particles for re-use.

Refer to the photocopy entitled "CS201 Cable Stripper" by Gensco of Lithinia, GA. Wire manufacturers and scrap yards are also known to have machines like the CS201. These machines are usually used to strip the more valuable heavy gauge wires. While these machines do a suitable job removing the jacket they also tend to nick the conductor because they cut into the wire radially. Nicked wire conductors cannot be re-insulated, therefore, the wire conductor is smelt.

U.S. Pat. No. 3,316,781 to Bignell et al (1967) and 3,044,170 to Agombar et al (1962) show cable stripping devices similar to the CS201 machine. The cutting action of both devices is achieved through two rotary knives that cut into the wire in a radial fashion. These inventions are more suitable for the scrap yard business where the reclaimed conductor will be smelt.

U.S Pat. No. 2,521,688 to Cataldo et al (1950) basically shows a speciality tool for stripping TV antenna type wire. This device incorporates a two piece plunger cutter with blades that transversely sever the insulation material around the circumference and in-between the parallel spaced conductors. This device is designed to cut away a specific amount of insulation from a specific type of wire. This cutter is best suited for speciality wire preparation or field use as a hand held tool. This device would not be suitable as a high volume wire stripper.

U.S. Pat. No. 3,377,891 to Horrocks (1968) and U.S. Pat. No. 3,990,331 to Matthews (1976) both disclose devices which pare the insulation off the wire like paring an apple. These devices would best be suited in the electrical production industry where specific lengths of insulation need to be removed. Horrocks cutter would also work well for field use cutting requirements. Neither of these devices are well suited for high volume stripping as they both cut into the wire insulation in a tangential fashion. Off center conductors would most certainly get nicked by devices of this type.

U.S. Pat. No. 4,577,405 to Butler shows a device which incorporates mating V-shaped shear blades. These blades basically work together gathering the wire and urging it towards the interior blades. These blades close in and cut the insulation around the conductor in a circumferential fashion. This device is best suited as a hand held field use stripper or automated stripper in electrical production. This device is best suited for removing specific lengths of insulation and not the insulation from an entire spool of wire.

U.S. Pat. No. 2,873,489 to Hirschhorn (1959) discloses a device for removing the tubular container in which metal flint rod is cast for cigarette lighters and the like. This is a multi-stage device which slits, peels and unwraps the flint rod. The initial cutting action is achieved by a radial cutting blade. After the initial cut the container encasing the flint rod is peeled, spread and flattened, separating the flint rod from the casting container. Such a device would not be suitable for stripping wire for re-manufacturing as it cuts in a radial fashion. Off center conductors would get nicked from this device.

Christiansen's British patent # 627,237 and Swedish patent # 127,379 shows a device which utilizes two cutter blades which cut into the wire in a radial fashion. Nowhere does Christiansen discuss, disclose or suggest a wire stripper which is designed to strip electric cables while leaving the center conductor unharmed and ready for re-insulation. Christiansen's stripper works by cutting a strip of insulation in a radial fashion thus making it easier to remove the remainder of the insulation jacket. Christiansen's stripper is a crude hand held scrap yard stripper at best designed to remove the center conductor portion with no consideration of saving the center conductor for re-insulation or avoiding scoring the conductor. If Christiansen's device were used as is, or even modified it would successfully strip the wire, but it would also severely score, groove, mangle and damage the center conductor portion of the wire being stripped as the cutter wheels would cut into the center conductor. Any conductors reclaimed from using Christiansen's device would most definitely need to be smelted.

The stripping fingers as taught by Kontz, U.S. Pat. No. # 4,754,962 merely shows a series of fingers which guide the labels onto a stacking magazine. The fingers direct labels or strips off a transfer drum to a stacking means.

Jaeger's U.S. Pat. No. # 2,548,977 shows a manual hand held sheath slitter having two sets of low profile cutters spaced apart by intermediate sections. Jaeger's stripper was designed to strip leaden mantled multi-conductor cables. Jaeger's disclosure does not provide a stripper which successfully strips a single wire and renders the conductor unharmed and ready for re-insulation. Jaeger's slitter cuts a section of the insulation material like that of Christiansen's stripper, but does this on two areas of the wire, top and bottom. The end result would be a cable with two sections of the outer insulation jacket material cut thus making it much easier to peel apart over Christiansen's device. Jaeger's intermediate section merely widens the space between the cutters in an approximate fashion to accommodate larger cables. The depth of the cut is fixed no matter which intermediate section is used because the low profile cutter blades are built into tapered roller members. Jaeger's wire stripper is merely a fancier version of Christiansen's device showing no precise consideration to the diameter of the conductor or the overall thickness of the wire being stripped.

Terada's U.S. Pat. No. # 3,641,852 shows a wire stripper with a pair of matched rollers each having multiple matching concave grooves. The insulation is cut at four points in a radial method. This device would not be suitable for reclaiming the conductor unharmed.

Beyer's U.S. Pat. No. # 2,648,899 shows a stripper which is very similar to Christiansen's stripper mentioned above. The cutter wheels in Beyer's patent are in a fixed position with regards to the width and depth of the cut. This device would not be suitable for reclaiming the conductor unharmed.

Denney's U.S. Pat. No. # 3,309,947 shows a wire stripper with a single cutter which cuts into the wire in a radial fashion. A stripping cone is positioned after the cut to urge the insulation material off the wire. The radial cutter blade is far too risky to the conductor and would most likely score or groove the conductor in the stripping process.

Wollerman's patent # 5,414,931 shows a design of cutter blades which would best be suited as a hand held field use tool. The design disclosed in Wollerman's patent would not be suitable for stripping large runs of wire.

OBJECTS AND ADVANTAGES

Accordingly, it is a goal of the present invention to provide an apparatus that will effectively strip the insulation from the electrical conductor with virtually no damage to the conductor, a process that will render the conductor ready for re-insulation. In doing so, this process will save wire manufacturers significant amounts of money and time when dealing with reject wire over the current methods in place today. It is also a goal of the present invention to provide an apparatus for stripping wire that will render clean separated plastic insulation that could be recycled for products such as outdoor playground toys, garden tools and the like. It is also a goal of the present invention to provide a wire stripping device which would be of moderate cost in comparison to the other services and machines presently used. It is also another goal of the present invention to provide a wire stripper with precision wire guide and cutter spacer sets, each exclusive to a specific size wire enabling a wide variety of sizes and types of wire to be stripped. Further objects and advantages of the present invention will become apparent from a consideration of the drawings and ensuing description.

DRAWING FIGURES

FIG. 6-A shows an enlarged fragmental detail view of roller assembly and cutter assembly fitted with a small wire size cutter spacer installed.

FIG. 6-B shows an enlarged fragmental detail view of roller assembly and cutter assembly fitted with a large wire size cutter spacer installed.

Figure 7:
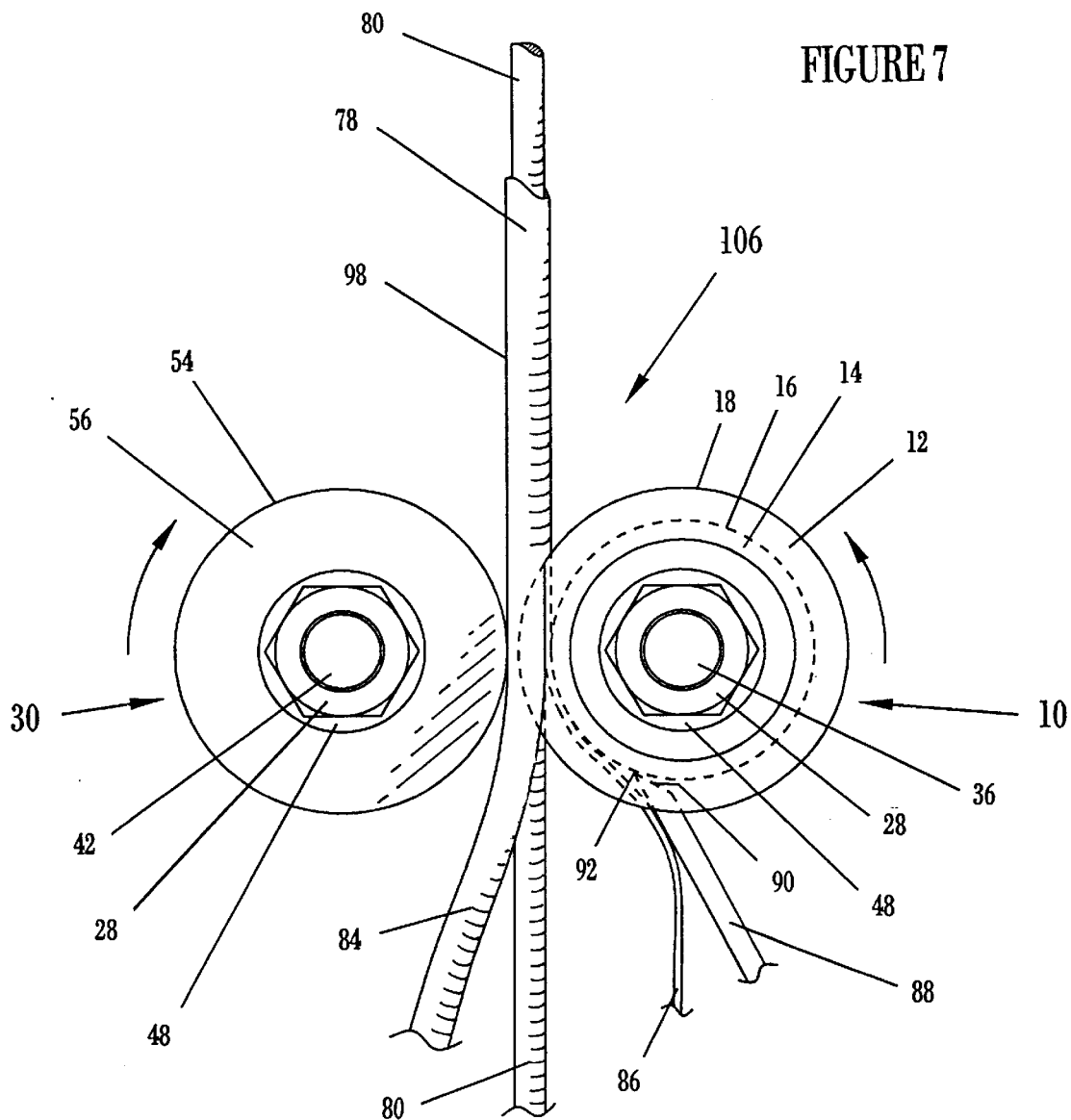

FIG 7 shows a side view of high volume cutter and roller assembly.

Figure 8:
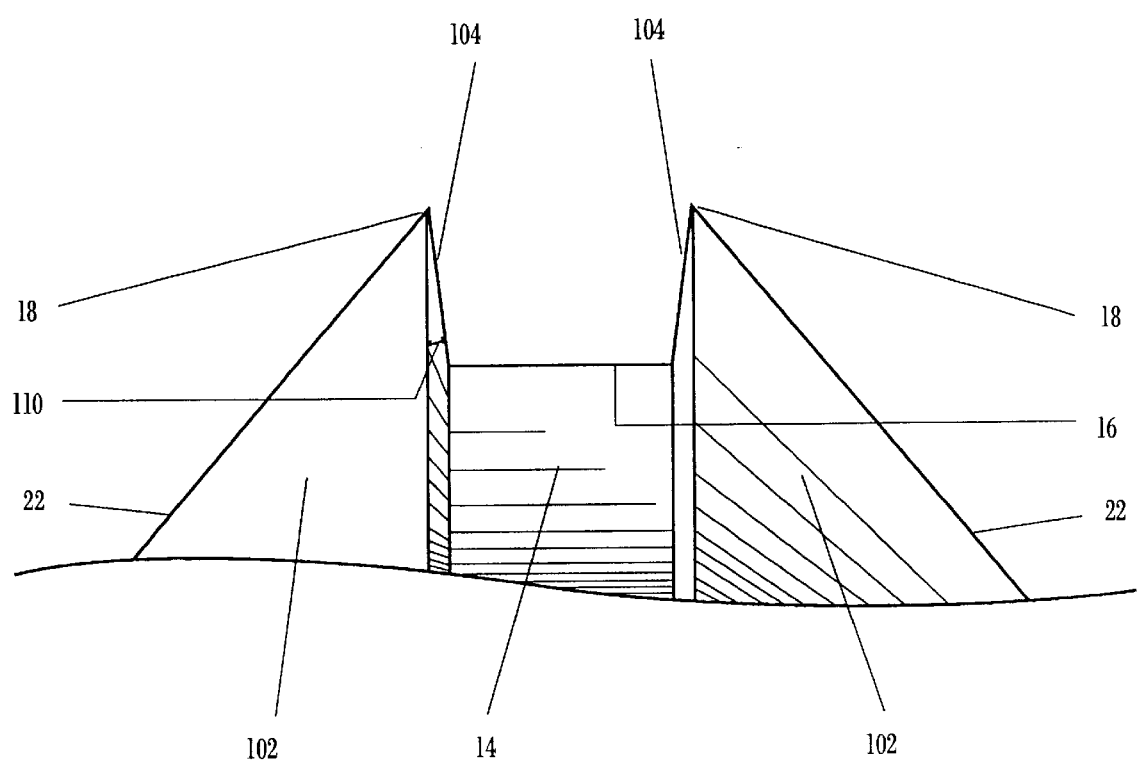

FIG. 8 shows an enlarged fragmental detail view of cutter assembly fitted with alternative cutter wheels incorporating offset cutter edges.

Figure 9:
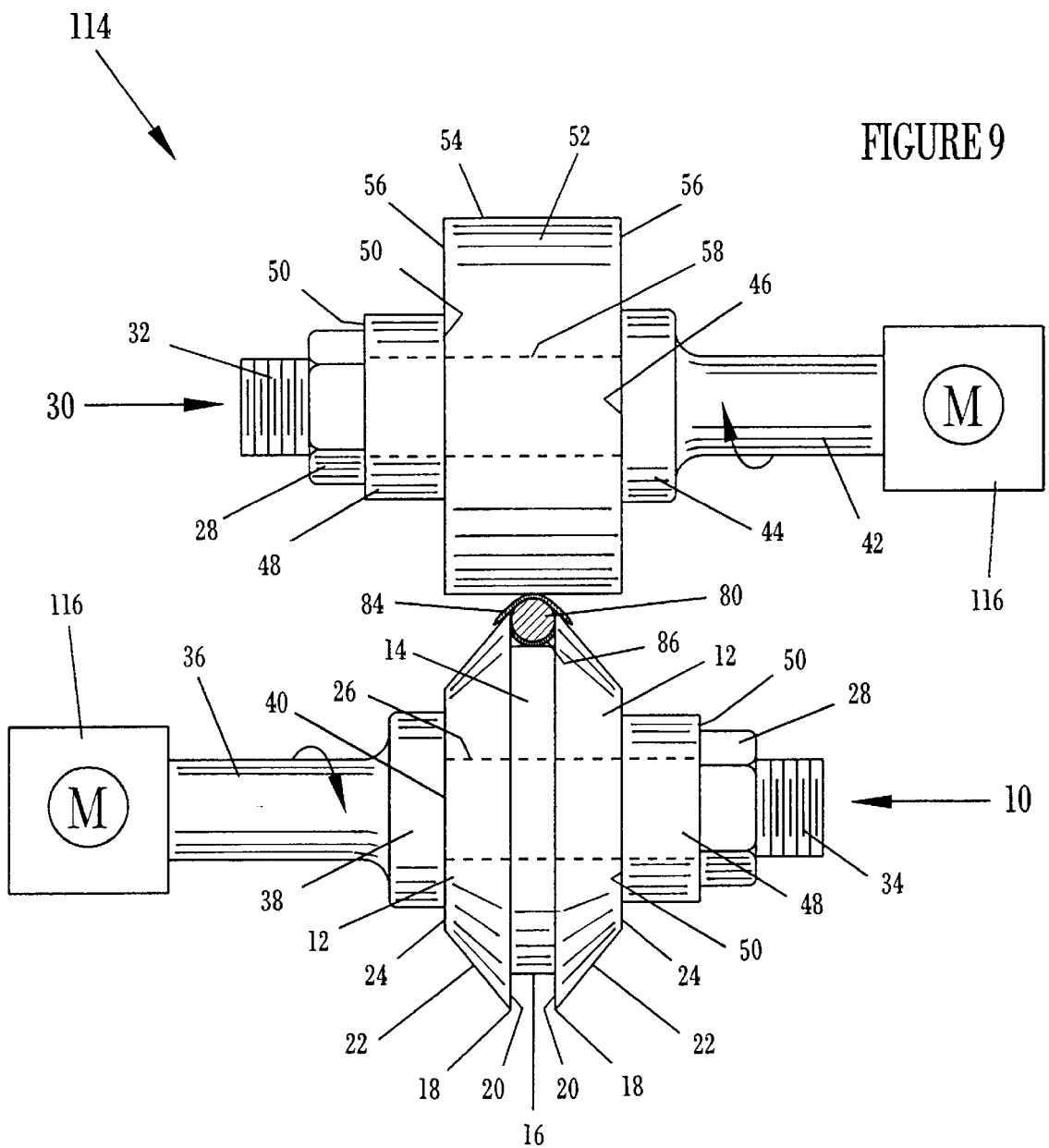

FIG. 9 shows a bottom view of a motorized high volume wire stripper (less diverter 88).

Figure 10:
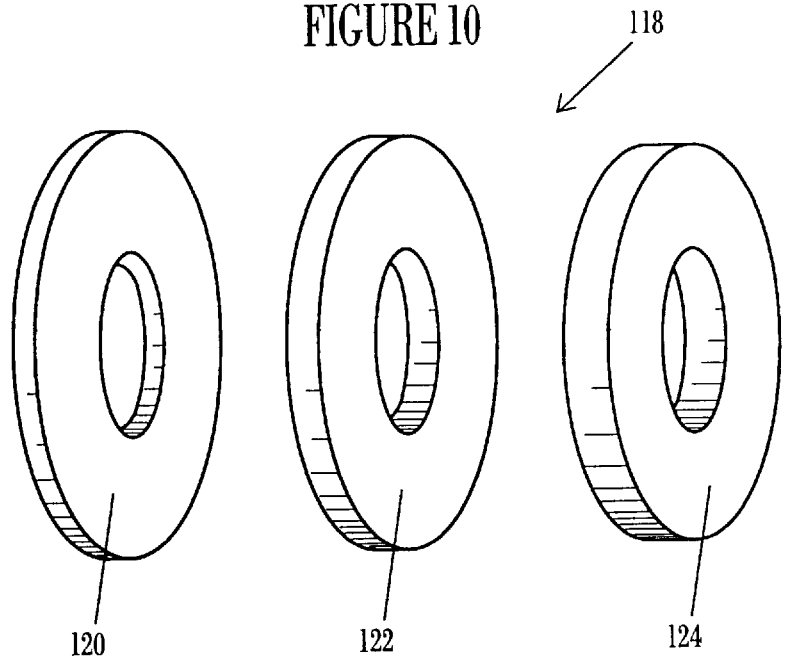

FIG. 10 shows a perspective view of cutter spacer set

Figure 11:
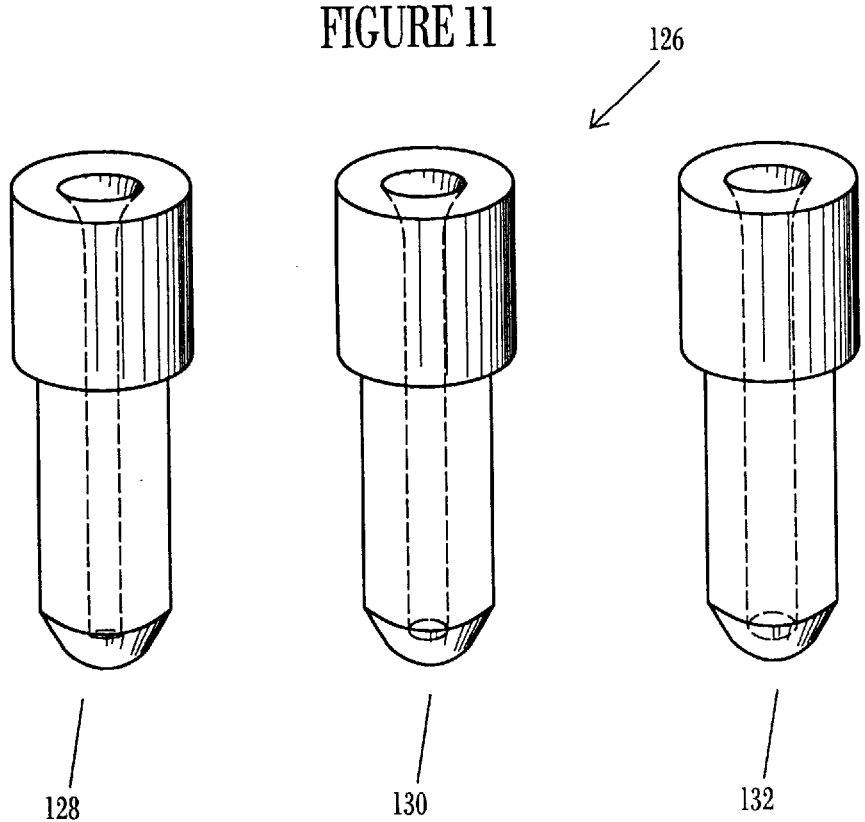

FIG. 11 shows a perspective view of wire guide set

Figure 12:
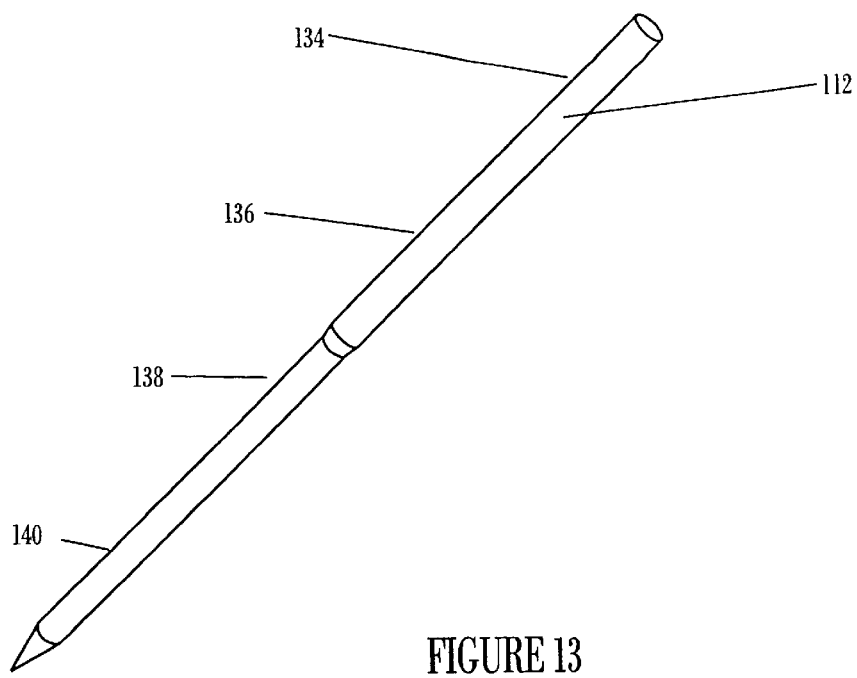

FIG. 12 shows a perspective view of alignment pin

Figure 13:
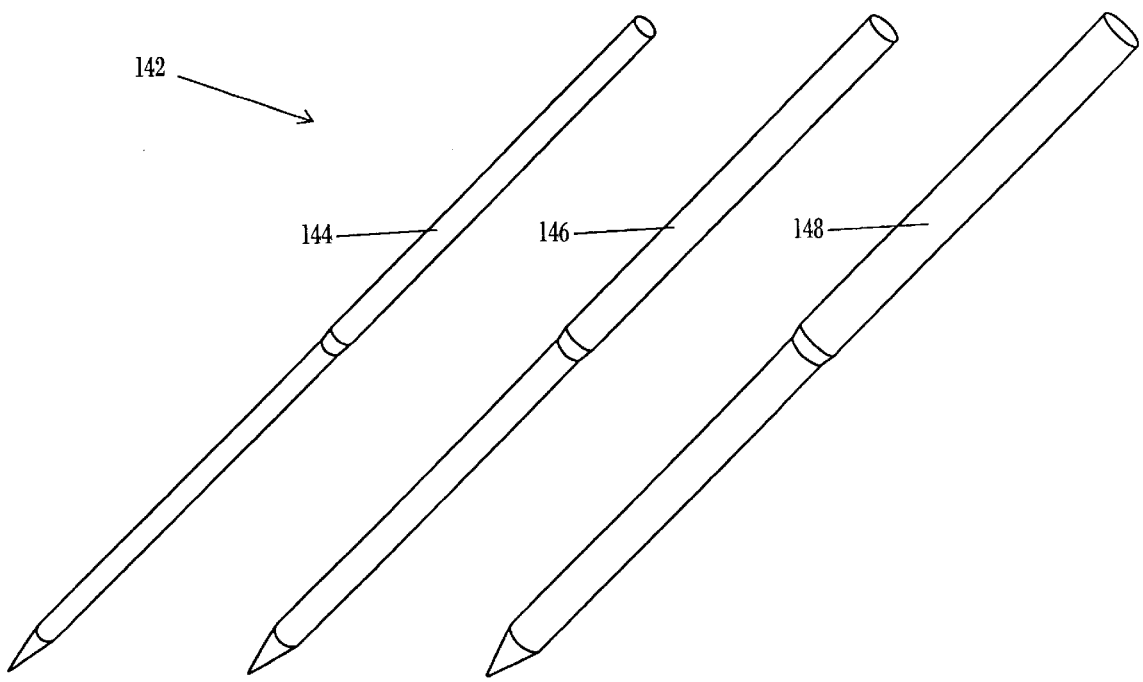

FIG. 13 shows a perspective view of alignment pin set

DRAWING REFERENCE NUMERALS

10 Cutter assembly
12 Cutter wheel
14 Cutter spacer
16 Spacer O.D. surface (outside diameter)
18 Cutter edge
20 Inner face
22 Slope
24 Outer face
26 Center bore
28 Nut
30 Pinch roller assembly
32 Roller shaft threads
34 Cutter shaft threads
36 Cutter shaft
38 Cutter shaft flange
40 Cutter flange face
42 Pinch roller shaft
44 Roller shaft flange
46 Roller flange face
48 Shaft spacer
50 Spacer face
52 Pinch roller
54 Roller surface
56 Roller face
58 Roller center bore
60 Wire guide
62 Guide holder
64 Guide funnel
66 Collar underside
68 Guide collar
70 Guide body
72 Wire bore
74 Guide bore
76 Set screw
78 Wire
80 Conductor
82 Bevel
84 Insulation major
86 Insulation minor
88 Diverter
90 Diverter taper
92 Point
94 Clerance
96 Wire guide assembly
98 Insulation
100 High volume wire stripper
102 Offset cutter wheel
104 Cutter edge bevel
106 High volume wire cutter and roller assembly
108 Slope angle
110 Cutter edge bevel angle
112 Alignment pin
114 Motorized cutter and roller assembly
116 Electric motor
118 Cutter Spacer Set
120 14 AWG cutter spacer
122 12 AWG cutter spacer
124 10 AWG cutter spacer
126 Wire Guide Set -continued

DRAWING REFERENCE NUMERALS 128 14 AWG wire guide
130 12 AWG wire guide
132 10 AWG wire guide
134 Wire bore gauge
136 Wire bore gauge taper
138 Cutter spacer gauge
140 Cutter spacer gauge taper
142 Alignment pin set
144 14 AWG alignment pin
146 12 AWG alignment pin
148 10 AWG alignment pin

BEST MODE FOR CARRYING OUT INVENTION FIGS. 1–13

Figure 1:
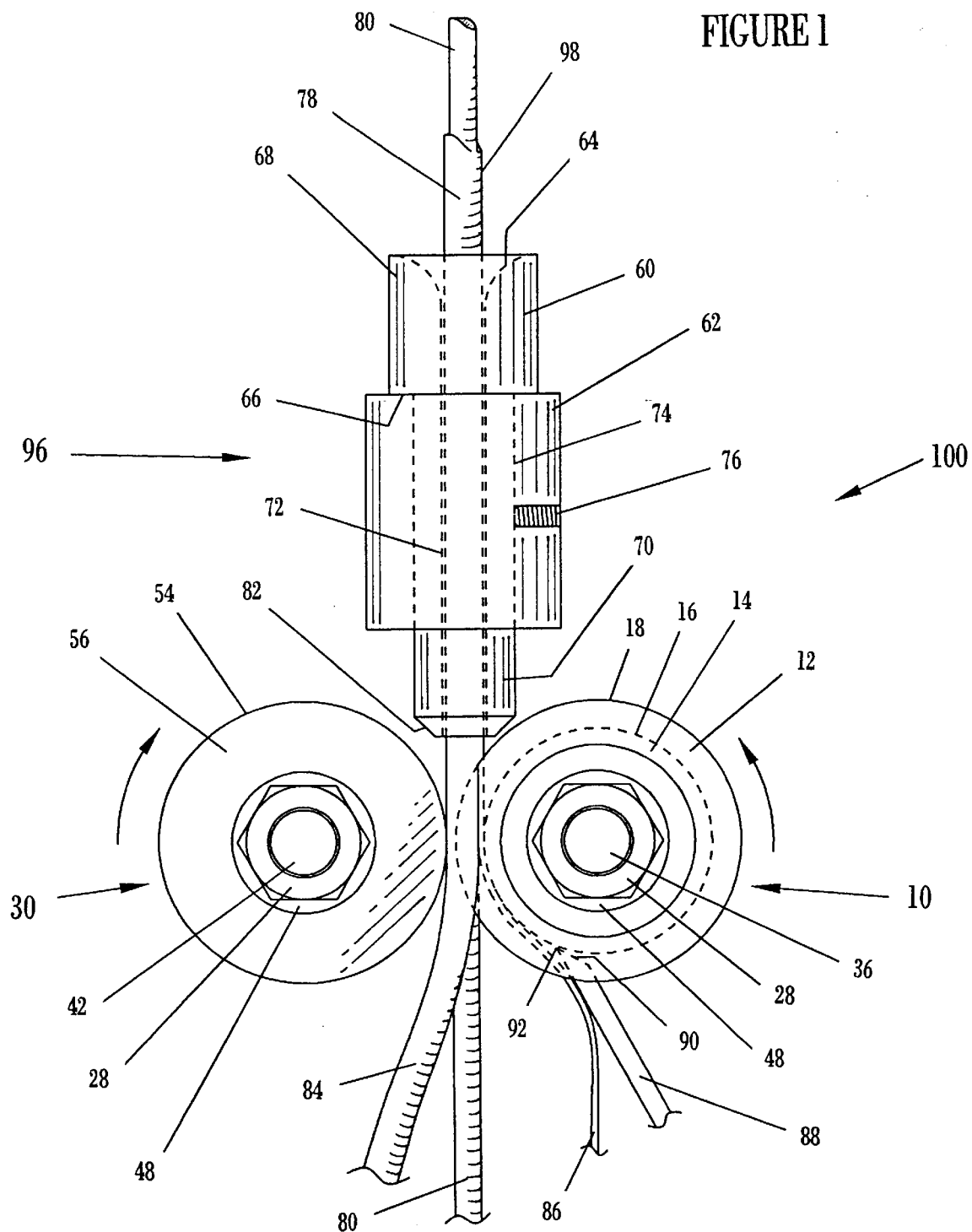
FIG. 1 shows a side view of high volume wire stripper.

Referring to FIG. 1 there is shown a simple embodiment of high volume wire stripper 100. Stripper 100 is comprised of a cutter assembly 10, a pinch roller assembly 30 a wire guide assembly 96 and a diverter 88. Together cutter assembly 10, roller assembly 30, wire guide assembly 96 and diverter 88 effectively strip wire 78 of its insulation 98 as it passes by the cutter wheels 12 with no damage to the conductor 80. Wire guide assembly 96 precisely directs wire 78 through cutter assembly 10 and roller assembly 30. Insulation 98 of wire 78 is cut and sheared by cutter wheels 12. Diverter 88 directs part of cut insulation 98 away from stripper 100.

Figure 2:
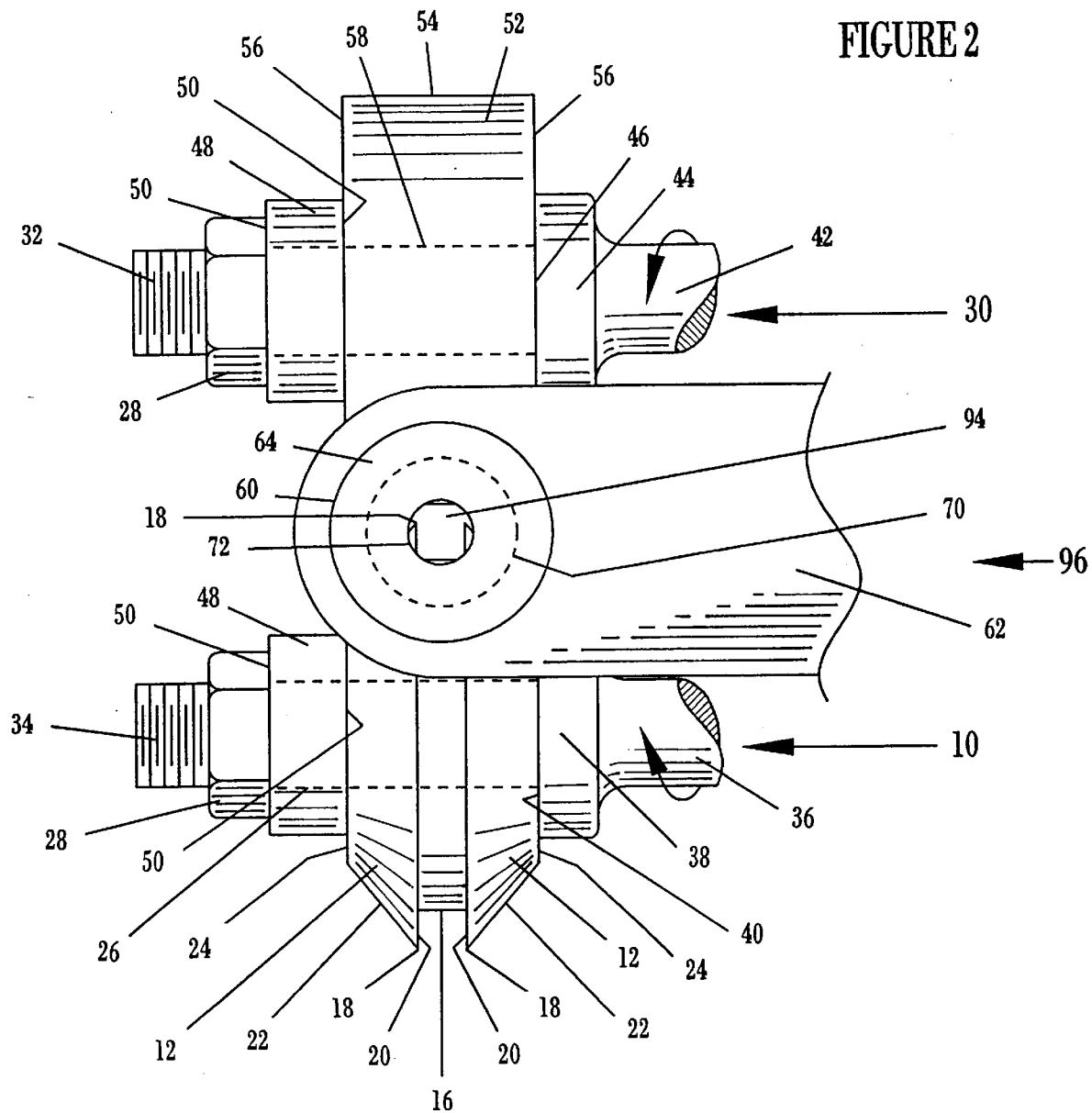
FIG. 2 shows a top view of high volume wire stripper.

Referring to FIGS. 1 and 2 cutter assembly 10, pinch roller assembly 30 and wire guide assembly 96 are mounted to a support apparatus (not shown). The support apparatus (not shown) typically supports assemblies 10, 30, 96 and diverter 88 allowing precise, stable operation. Furthermore, support apparatus (not shown) incorporates adjustment means which provide alignment and clearance adjustments between assemblies 10, 30, 96 and diverter 88. Support apparatus (not shown) could also include counterbalance or drive means which could improve or expedite operation of wire stripper 100 within a wider range of stripping applications. Designs of such support apparatus (not shown) are very common in the machine industry and can incorporate some or all of the above mentioned features.

It should be obvious to those skilled in the art that wire stripper 100 can work in conjunction with conventional industrial equipment that guide, straighten, stabilize, un-spool and spool wire (not shown). Wire stripper 100 may be positioned or mounted at an appropriate point in the production line where insulation 98 is needed to be removed prior to being re-insulated or wound onto a spool.

Figure 3:
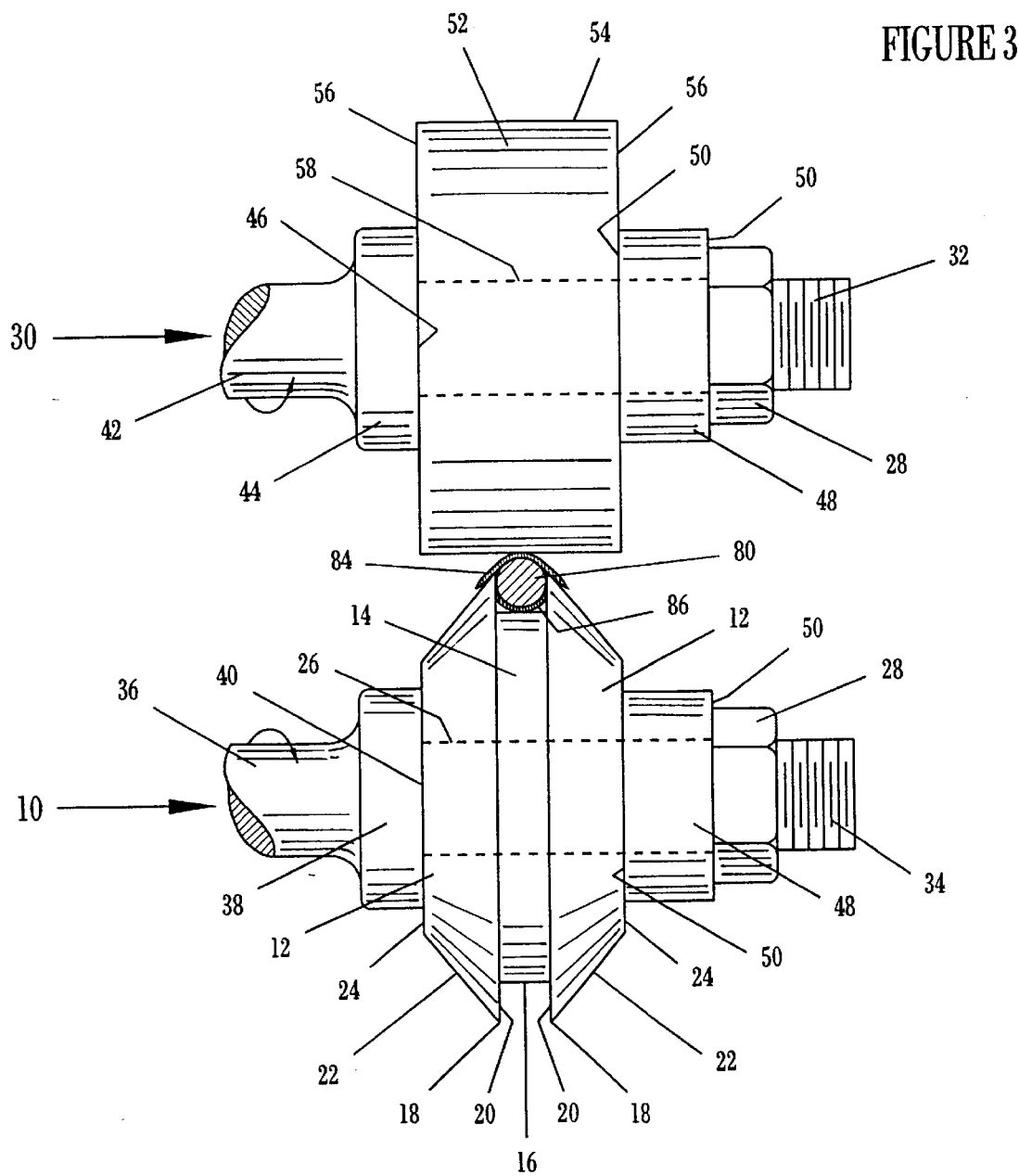
FIG. 3 shows a bottom view of high volume wire stripper (less diverter 88).

Referring to FIGS. 3 there is shown cutter assembly 10. Cutter assembly 10 consists of a cutter shaft 36, cutter wheels 12, a cutter spacer 14, a shaft spacer 48 and a nut 28. Cutter shaft 36 is an open arbor design enabling easy access to cutter wheels 12 and cutter spacer 14. Cutter shaft 36 is precisely machined of steel and hardened and incorporates a cutter shaft flange 38 and threads 34. Flange 38 of cutter shaft 36 is a machined fixed position collar with a cutter flange face 40. Flange face 40 provides a precision mount stop for cutter wheels 12 and cutter spacer 14. The portion of cutter shaft 36 where cutter wheels 12 and cutter spacer 14 are mounted is precisely machined smooth while threads 34 terminate within the space on shaft 36 where shaft spacer 48 is positioned. The balance of shaft 36 (not shown) is securely mounted to support stand and fitted into bearings (not shown) suitable to withstand the thrust from operation while not permitting any in and out movement. It is obvious that any in and out movement of cutter shaft 36 would decrease the accuracy during operation. In this particular embodiment shaft 36 is mounted in a fixed position with no adjustments and spins freely in its bearings (not shown).

Figure 4:
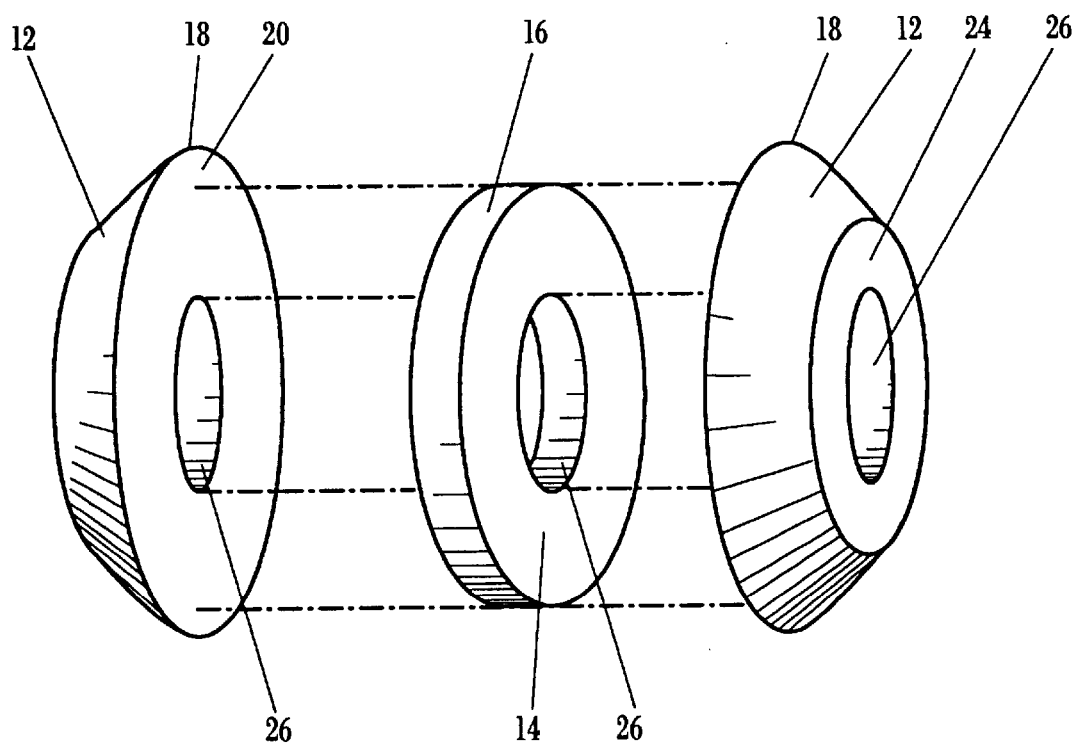
FIG. 4 shows an exploded perspective view of cutter wheels and cutter spacer.

Referring to FIGS. 3 and 4 cutter wheels 12 of cutter assembly 10 are a matched set of frustoconical shaped cutter wheels 12. Cutter wheels 12 are precisely machined of type A2 steel and hardened. Type A2 steel is commonly used for parts of this type and possess excellent machining and abrasion resistant characteristics. Cutter wheels 12 incorporate a cutter edge 18, a slope 22, a slope angle 108, an inner face 20, an outer face 24 and a center bore 26. Center bore 26 is a center hole through cutter wheels 12 enabling cutter wheels 12 to be mounted on cutter shaft 36. The fit between center bore 26 and the outside diameter of cutter shaft 36 to which it is mounted is no more than 0.05 mm. Close fits of this type are common in the machine industry and guarantee precision operation. Slope angle 108 of cutter wheels 12 is a forty degree angle (FIG. 6A). The significance of slope angle 108 is to back up cutter edges 18 with mass for better heat dissipation and assist in urging the cut insulation major 84 away FIG. 3. The effective range of slope angle 108 is between thirty and sixty degrees. The ideal range of slope angle 108 is between thirty five and fifty five degrees.

Referring to FIGS. 2, 3 and 4 there is shown cutter spacer 14 of cutter assembly 10. Spacer 14 is a steel washer which is fitted between cutter wheels 12 on cutter shaft 36. Spacer 14 is precisely machined of type A2 steel, hardened. Spacer 14 acts as the cut gauge which determines the width and depth of the cut. Spacer 14 has an O.D. (outside diameter) surface 16 and a center bore 26. The fit between center bore 26 and the outside diameter of cutter shaft 36 to which it is mounted is no more than 0.05 mm. The O.D. surface 16 dimension and thickness of spacer 14 are dependent upon the size wire being stripped.

Referring to FIGS. 6-A and 6-B, it should be understood that spacers 14 discussed herein are relative and exclusive to cutter wheels 12 discussed herein. Spacers 14 would be machined with the dimensions of cutter wheels 12 in mind. The width of spacer 14 determines the size of conductor 80 it will allow to pass between cutter edges 18 of cutter wheels 12. Thus, spacer 14 should be at least as wide as conductor 80 of wire 78 being stripped. Additionally, the O.D. surface 16 diameter of spacer 14 dictates the depth of the cut by defining the distance between O.D. surface 16 of spacer 14 and cutter edges 18 of cutter wheels 12.

Referring to FIG. 6-B, a thicker spacer 14 with a smaller O.D surface 16 would produce a wider, deeper cut for a large size wire 78. Referring to FIG. 6-A, a thinner spacer 14 with a larger O.D. surface 16 would produce a thinner, shallower cut for a small size wire 78. For each size wire 78 to be stripped an exclusive spacer 14 will be needed. Multiple sets of spacers 14 will allow an operator of stripper 100 to effectively remove insulation 98 from a wide variety of sizes of solid or braided conductor 80 wire 78.

Referring to FIG. 10 there is shown a simple example of cutter spacer set 118. Cutter spacer set 118 consists of three specific cutter spacers 14: 14 AWG (American Wire Gauge) cutter spacer 120, 12 AWG cutter spacer 122 and 10 AWG cutter spacer 124. Cutter spacer set 118 is a simple example of a precision set of specific cutter spacers 14 for cutting specific sizes and type of wire 78. In this case cutter spacer set 118 provides three cutter spacers 120, 122 and 124 which are precise and specific for the three most commonly used sizes of copper, solid conductor 80 wire 78 with a commonly known THHN insulation jacket 98. insulation jacket 98 consisting of PVC ( Poly-Vinyl-Chloride ) with an outer layer of nylon. THHN type ire 78 is commonly used in the home building industry. Referring to the Schedule below there is listed the specific dimensions of the wire 78 to be stripped and the appropriate cutter spacer 14 to use with it's dimensions.

CUTTER SPACER SPECIFICATION SCHEDULE
(Specific for 14, 12 and 10 AWG-THHN solid conductor 80 wire 78)
The below dimensions are based on use with a set of cutter wheels 12
with an overall cutter edge 18 diameter of 50.8 mm.

| Wire 78 Size | Cutter Spacer 14 # | Conductor 80 O.D | Cutter spacer 14 (thickness) | Cutter Spacer O.D 16 diameter | Wire 78 diameter with insulation |
|---|---|---|---|---|---|
| 14 AWG | 120 | 1.63 mm | 1.71 mm | 48.27 mm | 2.667 mm |
| 12 AWG | 122 | 2.057 mm | 2.16 mm | 47.88 mm | 3.073 mm |
| 10 AWG | 124 | 2.590 mm | 2.72 mm | 46.82 mm | 4.191 mm |

It should be understood that the above schedule is merely to exemplify the dimensions between the wire 78 being stripped and the appropriate cutter spacer 14 to be used. Because wire 78 dimensions can vary between manufacturers, the cutter spacers 14 may not work for all THHN solid conductor wire 78 sizes listed above. Additionally, different insulation 98 types and wire 78 types such as braided conductors 80 may require wider clearances than shown herein, therefore the figures shown herein should be used as a starting point guideline and not as a rule.

The above cutter spacer 14 thickness specifications were calculated for a 5% clearance of conductor 80 to cutter edges 18 under the formula: 5% of the conductor 80 diameter added to the diameter of conductor 80 equals cutter spacer 14 thickness.

The above cutter spacer O.D. 16 diameter specifications were calculated for a 95% penetration of insulation 98 under the formula: 95% of total wire 78 diameter minus the total diameter of the cutter wheels 12 (50.80 mm)=O.D. surface 16 diameter.

The above described 5% clearance formula for cutter spacer 14 thickness and 95% penetration formula for O.D. surface 16 diameter is considered a minimum clearance specific for the type of wire 78 specified above. The above listed clearance and penetration formulas have been found to be ideal for the type of wire specified above. However, slightly wider clearances and shallower penetration percentages would work as well. There is a point where the percentages if too wide or too shallow will not work. If cutter spacer 14 is too wide then the insulation 98 material will not successfully get cut. Likewise, if O.D. surface 16 diameter only offers a 50% penetration of insulation material than the insulation 98 would not successfully get cut. Obviously, if clearance and penetration percentages were too tight or large then damage to wire 78 or cutter wheels 12 would occur. The actual ideal clearance percentages for other types of wire 78 with other types of insulation material 98 would require a few trial runs to determine the ideal percentages. Therefore, the discretion of the operator of stripper 100 would determine the appropriate clearance and penetration percentages to use after close examination and exact measurement of the wire 78 to be stripped.

Referring to FIG. 3 there is shown a solid conductor 80 wire 78 being stripped. Spacer 14 is 0.075 mm wider than the total diameter of conductor 80 of the wire 78 being stripped. O.D. surface 16 is of a size that allows cutter edges 18 of cutter wheels 12 to penetrate the insulation 98 of wire 78 up to 95% of the total diameter of wire 78. Having cutter wheels 12 cut into insulation 98 of wire 78 up to 95% of the total diameter of wire 78 insures a deep cut while not coming in contact with roller surface 54.

Referring to FIG. 3 the final components of cutter assembly 10 are shaft spacer 48 and nut 28. Together spacer 48 and nut 28 secure cutter wheels 12 and spacer 14 on cutter shaft 36. Spacer 48 is wide enough so that a wide range of spacers 14 can be used without the outer cutter wheel 12 being positioned on threads 34 of cutter shaft 36. Having outer cutter wheel 12 partially positioned on threads 34 would not alter performance. However, it is more desirable to have both cutter wheels 12 positioned on the smooth portion of shaft 36.

Referring to FIG. 3 cutter assembly 10 is assembled by first choosing a matched pair of cutter wheels 12 and appropriate size spacer 14. The first cutter wheel 12 is fitted onto shaft 36 with its smaller outer face 24 resting against flange face 40. Next, the desired size cutter spacer 14 is fitted onto shaft 36 mating against inner face 20 of cutter wheel 12. The other cutter wheel 12 is fitted with its inner face 20 mating against spacer 14. Spacer 48 is fitted next with its face 50 resting against outer face 24 of cutter wheel 12. Lastly, nut 28 is threaded onto threads 34 of shaft 36 and tightened against face 50 of spacer 48. Nut 28 is tightened until cutter wheels 12 and spacer 14 are all seated tightly together and secure against flange face 40.

Referring to FIGS. 2 and 3 there is shown pinch roller assembly 30. Pinch roller assembly 30 consists of a pinch roller shaft 42, a pinch roller 52, a shaft spacer 48 and a nut 28. Pinch roller 52 is a wheel precisely machined of type A2 steel, hardened. Pinch roller 52 incorporates a roller surface 54, roller sides 56 and a roller bore 58. Surface 54 of roller 52 is smoothly machined. Referring to FIGS. 2 and 3 roller shaft 42 is identical to cutter shaft 36. Roller shaft 42 incorporates a roller shaft flange 44, a roller flange face 46 and threads 32. Roller shaft 42 is mounted to the same support apparatus (not shown) that supports cutter assembly 10. Cutter shaft 36 and roller shaft 42 are mounted parallel to each other on support apparatus (not shown). Referring to FIG. 2 support apparatus (not shown) also provides roller shaft 42 with adjustment means that allow fine precise adjustments of clearance 94 between roller surface 54 and cutter edges 18. Having the ability to adjust clearance 94 allows the operator to more precisely set up stripper 100.

Referring to FIGS. 2 and 3 roller assembly 30 is assembled by fitting roller wheel 52 onto shaft 42. Side 56 of roller 52 rests against flange face 46. Shaft spacer 48 is then fitted onto roller shaft 42 with spacer face 50 resting against roller side 56. Nut 28 is threaded onto threads 32 of shaft 42 and tightened securing roller 52. The fit between roller center bore 58 of roller 52 and the outside diameter of roller shaft 42 to which it is mounted is no more than 0.05 mm. Close fits of this type are common in the machine industry and guarantee smooth precise operation.

Referring to FIGS. 1 and 2 there is shown wire guide assembly 96. Guide assembly 96 consists of a wire guide 60 and a guide holder 62. Wire guide 60 incorporates a guide shoulder 68, a wire bore 72, a guide body 70, a shoulder underside 66, a guide funnel 64 and a bevel 82. Guide holder 62 is machined of steel and hardened and incorporates a guide bore 74, a set screw 76 and support apparatus (not shown). Wire guide 60 is precisely machined of type A2 steel, hardened, with a tubular guide body 70. Shoulder 68 acts as a stop collar and incorporates guide funnel 64 machined within shoulder 68. Wire bore 72 is a precisely machined guide hole through wire guide 60. The diameter of wire bore 72 is dependant of the size wire 78 being stripped.

The diameter of wire bore 72 is approximately 5% larger than the diameter of wire 78 being stripped. It should be noted that guide 60 described herein is exclusive to one size wire. Multiple sets of guides 60 would allow an operator of stripper 100 to effectively guide a wide variety of sizes of wire 78 through cutter assembly 10.

Referring to FIG. 11 there is shown wire guide set 126. Wire guide set 126 consists of three specific wire guides 60: 14 AWG (American Wire Gauge) wire guide 128, 12 AWG wire guide 130 and 10 AWG wire guide 132. Wire guide set 118 is a simple example of a precision set of specific wire guides 60 for guiding a specific size and type of wire 78. In this case wire guide set 126 provides three wire guides 128, 130 and 132 which are precise and specific for the three most commonly used copper solid conductor wires 78 with THHN type insulation 98. Wire guides set 126 is intended to be used with cutter spacer set 118.

Referring to the Wire Guide Schedule below there is listed the specific dimensions of the wire 78 to be stripped and the appropriate wire guide 60 to use with it's dimensions.

WIRE GUIDE SPECIFICTION SCHEDULE
(Specific for 14, 12 and 10 AWG-THHN solid conductor 80 wire 78)

| Wire 78 Size | Wire Guide 60 # | Insulation 98 outside diameter | Wire bore 72 diameter |
|---|---|---|---|
| 14 AWG | 128 | 2.667 mm | 2.80 mm |
| 12 AWG | 130 | 3.073 mm | 3.22 mm |
| 10 AWG | 132 | 4.191 mm | 4.40 mm |

It should be noted that the 5% clearance margin listed above is exclusive to the type of wire 78 being stripped. The above listed margins might be too tight if one where cutting a wire 78 with a different type of insulation 98, or a wire 78 manufactured by a different manufacturer.

Referring to FIG. 1 guide 60 fits snugly into guide bore 74 of holder 62. The diameter of guide bore 74 is 0.05 mm larger than the outside diameter of guide body 70. Tight fits of this nature guarantee precise set up and operation. Guide 60 is secured to holder 62 by fitting shoulder underside 66 to the top side of holder 62 and tightening set screw 76 against body 70. The support apparatus for holder 62 (not shown) is attached to the same apparatus which supports cutter assembly 10, roller assembly 30 and diverter 88. Support apparatus for holder 62 (not shown) incorporates basic precise up/down and side to side adjustments which provide alignment and exchange capabilities for guide 60. Bevel 82 allows wire guide 60 to fit as close as possible to cutter assembly 10 and roller assembly 30. The closer guide 60 is to assemblies 10 and 30 greatly improves the accuracy of the cut by minimizing any fluctuations of wire 78 as wire 78 exits wire guide 60 and proceeds on through assemblies 10 and 30.

Referring to FIG. 2 it is crucial that wire guide 60 is precisely aligned with cutter assembly 10 to insure a clean cut. If guide 60 is not aligned with cutter assembly 10 then damage to conductor 80 could occur during operation. Alignment of wire guide 60 with cutter spacer 14 is achieved with the use of alignment pin 112. Referring to FIG. 12 there is shown alignment pin 112. Alignment pin 112 incorporates a wire bore gauge 134, a wire bore gauge taper 136, a cutter spacer gauge 138 and a cutter spacer gauge taper 140. Alignment pin 112 is precisely machined of mild steel. Wire bore gauge taper 136 and cutter spacer gauge taper 140 protect cutter spacer edges 18 when alignment pin 112 is used preventing blunt edges from hitting the cutter edges 18. Mild steel is used with alignment pin 112 because it is softer and cheaper in cost than type A2 steel.

Referring to FIG. 13 there is shown alignment pin set 142. Alignment pin set consists of three alignment pins 112: 14 AWG alignment pin 144, 12 AWG alignment pin 146 and 10 AWG alignment pin 148. Alignment pins 144, 146 and 148 are exclusive for aligning cutter spacers 120, 122 and 124 with wire guides 120, 130 and 132. The diameter of wire bore gauge 134 of alignment pin 112 is 0.05 mm narrower than the diameter of wire bore 72 of wire guide 60 to which it is intended to align. Additionally, the diameter of cutter spacer gauge 138 of alignment pin 112 has a diameter 0.05 mm less than the thickness of the cutter spacer 14 to which it is intended to align. It has been found that a 0.05 mm clearance between wire bore gauge 134 and wire bore 72 and cutter spacer gauge 138 and cutter spacer 14 provides an acceptable tolerance while allowing alignment pin to fit smoothly through assemblies 10 and 96. Referring to the Alignment Pin Schedule below there is listed the specific dimensions of alignment pins 144, 146 and 148 and the wire guide 60 and cutter spacer 14 to which they are to be used with.

ALIGNMENT PIN SPECIFICTION SCHEDULE

| Wire 78 size | Alignment Pin 112 # | Cutter spacer gauge 138 diameter | Cutter spacer 14 # and thickness | Wire bore gauge 134 diameter | Wire guide 60 # and wire bore 72 diameter |
|---|---|---|---|---|---|
| 14 AWG | 144 | 166 mm | 120/1.71 mm | 2.75 mm | 128/2.80 mm |
| 12 AWG | 146 | 211 mm | 122/2.16 mm | 3.17 mm | 139/3.22 mm |
| 10 AWG | 148 | 267 mm | 124/2.72 mm | 4.35 mm | 132/4.40 mm |

Alignment pin 112 is used to precisely align cutter spacer 14 with wire guide 60 so that wire 78 will pass by cutter wheels 12 and cutter wheels 12 will flank the conductor 80. Alignment pin 112 is fitted into wire guide 60 with cutter spacer gauge 138 entering wire bore 72 first. Alignment pin 112 is fitted down through wire bore 72 until both cutter spacer gauge 138 and wire bore gauge 134 are well engaged within assemblies 10 and 96 of which are to be aligned. Once assemblies 10 and 30 are aligned and mount adjustments (not shown) are tightened then alignment pin 112 is withdrawn.

It should be noted that cutter spacer set 118, wire guide set 126 and alignment pin set 142 are merely example sets. Sets 118, 128 and 142 could offer a wide variety of pieces to cut a large variety of sizes and types of wire 78.

Referring to FIG. 3 as stripper 100 cuts and shears insulation 98 from conductor 80 it produces two pieces of cut insulation 98 in the process, insulation major 84 and insulation minor 86. As insulation major 84 exits stripper 100 it tends to simply drop off while insulation minor 86 tends to cling to O.D. surface 16 of spacer 14.

Figure 5:
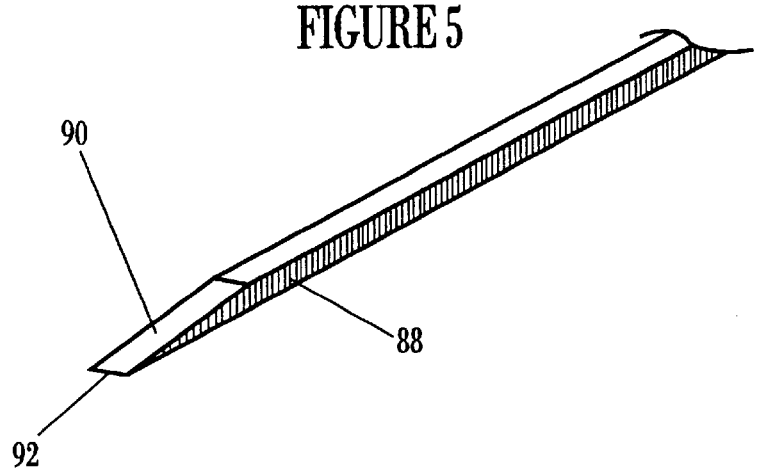
FIG. 5 shows a perspective view of diverter.

Referring to FIGS. 1 and 5 there is shown diverter 88. Diverter 88 acts as a clean out for cutter assembly 10 as it lifts and removes insulation minor 86 from O.D. surface 16 of spacer 14. Diverter 88 is precisely machined of type A2 steel, hardened, square stock. Square stock is preferred over rod stock as it is unlikely square stock would rotate or shift in its holder (not shown). Diverter 88 incorporates a diverter taper 90 and a point 92. Taper 90 is a gradual 45 degree slope to point 92. Point 92 is a sharp, square, tip end "chisel"-like point. Mount apparatus for diverter 88 (not shown) is attached to the same apparatus which secures, supports and permits adjustments for assemblies 10, 30 and 96. Mount apparatus for diverter 88 (not shown) permits easy installation of diverter 88 with adjustment means. Adjustment means enable precise positioning and clearance between point 92 of diverter 88 and O.D. surface 16 of spacer 14 of cutter assembly 10.

Referring to FIG. 1, diverter 88 is mounted and positioned at a point close after the cut of insulation 98 occurs in a tangential fashion with taper 90 facing towards O.D. surface 16. Point 92 of diverter 88 is positioned between 0.10 mm above O.D. surface 16 of spacer 14. Close clearances of point 92 and O.D. surface 16 ensure that diverter 88 will lift and remove insulation minor 86 out and away from cutter assembly 10.

An alternative embodiment is shown in FIG. 7, high volume wire cutter and roller assembly 106. Assembly 106 incorporates the most crucial components of stripper 100, cutter assembly 10, roller assembly 30 and diverter 88. All aspects of cutter assembly 10, roller assembly 30 and diverter 88 are identical to those of stripper 100. Assembly 106 is intended for sophisticated facilities currently possessing accurate wire guidance equipment. Assembly 106 is positioned at an appropriate point in the production line where insulation 98 needs to be removed. Set-up of cutter assembly 10 and roller assembly 30 is the same as described above for stripper 100.

Referring to FIG. 9 there is shown an alternative motorized high volume cutter and roller assembly 114. Al the components involved with assembly 114 are identical to those of stripper 100 except for the inclusion of an electric motor 116. Assemblies 10 and 30 are fitted with motors 116 which provide drive means to cutter shaft 36 and roller shaft 42 of assemblies 10 and 30. The drive means provided by motors 116 pulls wire 78 through assemblies 10 and 30 which is ideal for scrap yard applications where shorter pieces of wire 78 are stripped. In this particular embodiment motors 116 are small ½ horsepower electric motors 116. Motors 116 are wired so that they stop and start together operated by a foot switch (not shown). Assembly 114 is also fitted with a safety guard (not shown). Safety guard (not shown) is of a size that would protect the operator's hands or clothing from getting pulled through assemblies 10 and 30 during operation. Foot switch operation (not shown) and safety guard (not shown) are common in the machine industry with machines of this type that have sharp cutters and drive motors.

Referring to FIG. 9, motors 116 are identical and drive at the same speed and direction. Motors 116 are mounted on the same support apparatus (not shown) that supports assemblies 10, 30, 96 and diverter 88 with their output drives facing each other. Because motors 116 are mounted facing each other they are driving assemblies 10 and 30 in opposite directions from each other. It is important that assemblies 10 and 30 drive in opposite directions so that when wire 78 is fed through assemblies 10 and 30 wire 78 is drawn through. If assemblies 10 and 30 were rotating in the same direction feeding wire 78 through assemblies 10 and 30 it would be impossible, as the rotation of assembly 10 would be working against the rotation of assembly 30. Additionally, motors 116 are mounted on opposite sides so that they will not get in the way of each other when adjusting clearances between roller surface 54 and cutter edges 18 (FIG. 6-A).

It should be obvious to those skilled in the art that motors 116 can be connected to assemblies 10 and 30 in a direct drive, belt drive or gear drive fashion (not shown) all of which would provide the same end result.

Referring to FIG. 8 there is shown an alternative set of offset cutter wheels 102. Offset cutter wheels 102 are identical to cutter wheels 12 with respect to materials and dimensions with the additional inclusion of a cutter edge bevel 104. Cutter edge bevel 104 incorporates a cutter edge bevel angle 110. Cutter edge bevel 104 of cutter wheels 102 offsets cutter edge 18 thus producing a wider cut over cutter wheels 12 with the same size spacer 14 installed. Cutter wheels 102 are fitted to stripper 100 and assemblies 106 and 114 in a situation where insulation 98 of wire 78 being stripped is badly blistered or deformed. Badly blistered or deformed insulation 98 is harder to stabilize due to its imperfections, thus, a wider cut would protect conductor 80 from getting nicked. An effective angle range for bevel angle 110 is between zero and three degrees. A preferable angle for bevel angle 110 is one degree.

From the description above, a number of advantages of the high volume wire stripper 100 and high volume wire cutter and roller assemblies 106 and 114 and offset cutter wheels 102 become evident:

(a) Cutter edges 18 of cutter wheels 12 and 102 cut insulation 98 by flanking conductor 80 rather than cutting into conductor 80 in a radial or tangential fashion. A flanking cut effectively cuts, shears and removes insulation 98 while not cutting into conductor 80.

(b) Stripping wire 78 of insulation 98 and rendering undamaged conductor 80 for reuse can save wire manufacturers lots of money and time over the conventional recycling methods.

OPERATION FIGS. 1–11

In operation, FIG. 1, stripper 100 with assemblies 10, 30 and 96 would be used to remove insulation 98 from a spool of reject wire 78 to reclaim the conductor 80 for reuse. This process would save the manufacturer of wire 78 the cost of having to scrap or smelt the reject wire 78. To achieve this, stripper 100 must be adjusted and fitted with the correct size spacer 14, wire guide 60 and aligned with the appropriate alignment pin 112. To effectively choose the best size spacer 14 and wire guide 60, wire 78 must be measured to establish the outside diameter of the conductor 80 and the outside diameter of the insulation 98. The dimensions of wire 78 referred to the specification index of cutter spacer set 118, wire guide set 126 and alignment pin set 142 will indicate an appropriate selection. With cutter assembly 10 and guide assembly 96 fitted with the proper cutter spacer 14 and wire guide 60, then alignment must be done. The appropriate size alignment pin 112 which is matched with the selected cutter spacer 14 and wire guide 60 is fitted through wire bore 72 and between cutter wheels 12, FIG. 2. Once proper alignment has been achieved then all adjustment means (not shown ) for assemblies 10, 30 and 96 are locked and alignment pin 112 is removed. Next, pinch roller assembly 30 is adjusted. The purpose of pinch roller assembly 30 is to control and stabilize wire 78 as it passes by cutter assembly 10. Ideal adjustment of pinch roller assembly 30 is one where wire 78 is permitted to pass by cutter assembly 10 under smooth, firm tension. This is achieved by adjusting clearance 94 between roller face 56 and cutter edges 18 of cutter wheels 12 (FIG. 2). The clearance between roller face 56 and O.D. surface 16 of spacer 14 should equal the diameter of wire 78 being stripped. If pinch roller assembly 30 is too close to cutter edges 18 of assembly 10 then a squeezing effect will take place causing unnecessary friction. If pinch roller assembly 30 is too far from cutter edges 18 of assembly 10, nicking of conductor 80 could result from wire 78 being free to fluctuate as it passes by cutter wheels 12.

With the correct spacer 14 and wire guide 60 installed and all alignments and clearances adjusted, a test run should be conducted. To do this, a short piece of wire 78, usually no longer than 40–50 cm, is cut from the spool of wire 78 to be stripped. Manually, a 100 mm portion of the test piece of wire 78 is stripped of its insulation 98 exposing conductor 80. Next, the test piece of wire 78 is manually fed into and through wire bore 72 of guide 60. The 100 mm length of stripped wire 78 permits exposed conductor 80 portion to pass easily through cutter assembly 10. With the stripped conductor 80 portion of wire 78 fed through cutter assembly 10, the test can begin. Gripping the stripped conductor 80 portion with a suitable pair of pliers, the test piece of wire 78 is drawn through stripper 100. Care must be taken when pulling the test piece of wire 78 through stripper 100 to pull wire 78 as straight and smoothly as possible. Once the test piece of wire 78 has passed through stripper 100 strict examination of exposed conductor 80 must be made. If any nicking of conductor 80 is detected, the setup adjustments and alignments mentioned above should be double checked and or adjusted. After a test piece of wire 78 passes successfully through stripper 100 with no damage to conductor 80, the test should be repeated a few more times to insure the results are consistent.

Only after positive test results have been concluded should the stripping of a spool of wire 78 commence. The spool of wire 78 to be stripped should be prepared in the same fashion as the test pieces of wire 78 by removing approximately 100 mm of insulation 98 exposing conductor 80. After the spool of wire 78 is prepared, it would then be fed through conventional wire straighteners and guides (not shown) prior to entering stripper 100. After wire 78 is fed through stripper 100, it would be fed through another series of conventional wire straighteners and guides (not shown) prior to being fed onto and attached to the take up spool (not shown). The take up spool (not shown) would be fitted to a motorized shaft (not shown) which would provide the force for pulling wire 78 through stripper 100.

Referring to FIG. 1, as wire 78 passes through stripper 100 it first enters guide funnel 64 of guide 60. Funnel 64 allows wire 78 to enter into wire guide 60 with no chance of snagging due to the wide mouth entry of funnel 64. Funnel 64 quickly tapers into wire bore 72 which is a passage of a specific size and precise clearances allowing wire 78 to travel smoothly through wire bore 72 with as little extra movement as possible.

Referring to FIGS. 1 and 3, as wire 78 exits wire guide 60 it then immediately enters through cutter assembly 10 and roller assembly 30. With assemblies 10 and 30 set up as outlined above, insulation 98 of wire 78 is cut by cutter edges 18 of cutter wheels 12 flanking conductor 80. A cutting and shearing action takes place as cutter edges 18 pierce into insulation 98 with the cut actually happening within insulation 98 and not in-between insulation 98 and conductor 80. The force of the cut by cutter edges 18 and the urging spreading action of slope 22 is sufficient enough to shear the thin balance of insulation 80 remaining between conductor 80 and cutter edges 18. As the cut is completed, insulation 98 is split into two sections, insulation major 84 and insulation minor 86 (FIG. 3).

Referring to FIG. 1, as conductor 80 exits from assemblies 10 and 30 it moves on through conventional guides (not shown) and onto the final "take up" spool (not shown). As insulation major 84 exits from assemblies 10 and 30 it merely drops off and away from stripper 100. As insulation minor 86 exits stripper 100 it tends to cling to O.D. surface 16 of spacer 14. Point 92 of diverter 88 lifts insulation minor 86 off O.D. surface 16 while the body of diverter 88 directs insulation minor 86 out and away from stripper 100.

The operation of assembly 106 (FIG. 7) is identical to that of stripper 100 described above. Assembly 106 uses conventional wire guides (not shown) in place of wire guide assembly 96 (FIG. 1).

The operation of assembly 114 (FIG. 9) is also identical to that of stripper 100 but, includes the addition of motors 116. Motors 116 provide drive means for assemblies 10 and 30.

Once assemblies 10, 96 and 30 have been set up as described above for stripper 100, then a test is performed. Here, motors 116 are started by depressing foot switch (not shown) and a small piece of wire 78 is fed through assembly 114. Motors 116 driving assemblies 10 and 30 pull wire 78 through assembly 114. Assembly 114 is easily started and stopped with the foot switch (not shown). Once a successful test is complete as described above for stripper 100, wire 78 can be stripped. Because assembly 114 is best suited for scrap yard uses, wire 78 will drop off to the floor or into a barrel after exiting assembly 114. Wire 78 stripped by scrap yards is done for the purpose of reclaiming the conductor for resale as scrap metal. Therefore, the set-up does not need to be as accurate as described above for stripper 100 or assembly 106 where conductor 80 will be re-insulated.

SUMMARY, RAMIFICATIONS AND SCOPE

Accordingly, the reader will see that the high volume wire stripping invention provides a significant cost and time saving advantage for wire manufacturers and scrap yards with respect to processing reject wire and reclaiming the conductor for remanufacture. Its simple construction would make this invention accessible to even the smallest of wire manufacturers and scrap yards. The cutter wheels flank the conductor only cutting into the insulation, thus rendering unharmed conductor and clean insulation waste. This cleaner insulation waste can be more easily recycled for other products rather than dumped in land fills, while the unharmed conductor can be re-insulated.

While the above descriptions contain many specifics, they should not be construed as limitations on the scope of the invention but as merely providing illustrations of some of the presently preferred embodiments of this invention. Many other variations are possible such as the wire guide assembly could be exchanged for a more elaborate wire guide assembly incorporating adjustable rollers or guide wheels. High volume wire stripper could also include a post cut wire guide that would keep the conductor aligned with the cutter wheels after the cut. Pinch roller could also incorporate a knurled surface in place of the smooth surface. Thus, the scope of the invention should be determined by the appended claims and their legal equivalents, rather than by the examples given.

I claim:

1. A high volume wire stripper kit for cutting and removing surrounding insulation material from central electrical conductors in electrical wire, rendering said central electrical conductors undamaged comprising:

a cutter assembly having a matched pair of frustoconical cutter wheels mounted on a cutter shaft having an axis, said wheels each having a conical slope facing outward, said cutter wheels incorporating a cutter edge, a slope, and an inner face, and a cutter spacer positioned between said cutter wheels and mated against said inner faces of said cutter wheels, said cutter spacer being an interchangeable rigid washer having a predetermined thickness defining the distance said cutter edges of said cutter wheels are spaced apart, said cutter spacer having an O.D. surface of a predetermined size defining the distance said cutter edges of said cutter wheels can penetrate said insulation material surrounding said central electrical conductor of said electrical wire, said cutter spacer is part of a set of cutter spacers, said set of cutter spacers including an array of sizes of said cutter spacers, each said cutter spacer having a thickness and O.D. surface diameter accommodating a specific size and type of said electrical wire, a pinch roller assembly including a rigid roller cylinder mounted on a roller shaft having an axis, said roller cylinder incorporating a roller surface separated from said O.D. surface by a clearance distance, said pinch roller assembly being mounted with said shaft axis substantially parallel to said cutter shaft axis, said roller shaft also incorporates adjustment means permitting spacing adjustment between said cutter assembly and said roller assembly to match the clearance distance between said roller surface and said O.D. surface with the diameter of the wire being stripped while said cutter edges flank said central electrical conductor portion of said wire being stripped cutting only into said insulation material and not contacting said roller surface or said central electrical conductor, a diverter having a thin rigid finger with a distal end extending in a tangential fashion between said cutter wheels with said distal end in close proximity to said O.D. surface of said cutter spacer, a wire guidance means directing said electrical wire into said cutter assembly, said wire guidance means is an apparatus incorporated as part of said high volume wire stripper kit with an interchangeable wire guide, said wire guide being a rigid structure incorporating a wire bore, said wire bore is a hole slightly larger than said wire being stripped enabling said wire to pass smoothly and accurately through said wire guide, said wire guide being part of a set of wire guides, said set of wire guides including an array of sizes of said wire guides each specific for a specific size and type of said electrical wire, and alignment means enabling said cutter spacer and said guidance means to be accurately aligned, said alignment means comprises an alignment pin, said alignment pin being a rigid round stock two stage pin with a cutter spacer gauge and a wire bore gauge, said cutter spacer gauge being a portion of said alignment pin which possess a diameter slightly less than the thickness of said cutter spacer to which it is to align, said wire bore gauge is a portion of said alignment pin which possess a diameter slightly less than said wire bore of said wire guide to which it is to align, said alignment pin is one of a set of alignment pins, and said set of alignment pins are exclusive to a specific range of sizes and types of said electrical wire, whereby said cutter spacer defines the distance said cutter edges of said cutter wheels are spaced apart so that said cutter edges of said cutter wheels flank said central electrical conductor of said electrical wire introduced axially endwise between the cutter wheels and said pinch roller cylinder, said cutter edges of said cutter wheels only cutting into said insulation material of said electrical wire, said slope of said cutter wheels assists in shearing said insulation material, said pinch roller stabilizes said wire as it passes through said cutter assembly while said distal end of said diverter finger lifts and deflects any of said insulation material that clings to said O.D. surface of said cutter spacer.

2. A high volume wire stripper kit of claim 1 wherein said slope of said cutter wheels can have an effective angle range between thirty and sixty degrees measured from the diametric plane defined by said cutter edge of each said cutter wheel.

3. A high volume wire stripper kit of claim 1 wherein the effective angle range of said slope of said cutter wheels is between thirty five and fifty five degrees measured from the diametric plane defined by said cutter edge of each said cutter wheel.

4. A high volume wire stripper kit of claim 1 wherein said diverter is made of rigid square stock material and said distal end is a tapered sharp chisel end.

5. A high volume wire stripper kit of claim 1 further including drive means to drive said cutter shaft and said roller shaft providing rotational energy to said cutter assembly and said roller assembly, said drive means drives said cutter shaft and said roller shaft in opposite directions.

6. A high volume wire stripper kit for cutting and removing surrounding insulation material from central electrical conductors in electrical wire, rendering said central electrical conductors undamaged comprising:

a cutter assembly having a matched pair of frustoconical offset cutter wheels mounted on a cutter shaft having an axis, said offset wheels each having a conical slope facing outward wherein said slope of said offset cutter wheels has an effective angle range between thirty and sixty degrees measured from the diametric plane defined by said cutter edge of each said cutter wheel, said offset cutter wheels incorporating said slope, a cutter edge, an inner face and a cutter edge bevel, and a cutter spacer positioned between said cutter wheels and mated against said inner faces of said cutter wheels, said cutter spacer being an interchangeable rigid washer having a predetermined thickness defining the distance said cutter edges of said offset cutter wheels are spaced apart, said cutter spacer having an O.D. surface of a predetermined size defining the distance said cutter edges of said offset cutter wheels can penetrate said insulation material surrounding said central electrical conductor of said electrical wire, said cutter spacer is part of a set of cutter spacers, said set of cutter spacers including an array of sizes of said cutter spacers, each said cutter spacer having a thickness and O.D. surface diameter accommodating a specific size and type of said electrical wire, wherein said cutter edge bevel is a machined offset angle with a preferred angle between zero and three degrees measured from the diametric plane defined by said cutter edge of each said cutter wheel, a pinch roller assembly including a rigid roller cylinder mounted on a roller shaft having an axis, said roller cylinder incorporating a roller surface separated from said O.D. surface by a clearance distance said pinch roller assembly being mounted with said shaft axis substantially parallel to said cutter shaft axis, said roller shaft also incorporates adjustment means permitting spacing adjustment between said cutter assembly and said roller assembly to match the clearance distance between said roller surface and said O.D. surface with the diameter of the wire being stripped while said cutter edges flank said central electrical conductor portion of said wire being stripped cutting only into said insulation material and not contacting said roller surface or said central electrical conductor, and a diverter having a thin rigid finger with a distal end extending in a tangential fashion between said cutter wheels with said distal end in close proximity to said O.D. surface of said cutter spacer, a wire guidance means directing said electrical wire into said cutter assembly, said wire guidance means is an apparatus incorporated as part of said high volume wire stripper kit with an interchangeable wire guide, said wire guide being a rigid structure incorporating a wire bore, said wire bore is a hole slightly larger than said wire being stripped enabling said wire to pass smoothly and accurately through said wire guide, said wire guide being part of a set of wire guides, said set of wire guides including an array of sizes of said wire guides each specific for a specific size and type of said electrical wire, and alignment means enabling said cutter spacer and said guidance means to be accurately aligned, said alignment means comprises an alignment pin, said alignment pin being a rigid round stock two stage pin with a cutter spacer gauge and a wire bore gauge, said cutter spacer gauge being a portion of said alignment pin which possesess a diameter slightly less than the thickness of said cutter spacer to which it is to align, said wire bore gauge is a portion of said alignment pin which possesses a diameter slightly less than said wire bore of said wire guide to which it is to align, said alignment pin is one of a set of alignment pins, and said set of alignment pins are exclusive to a specific range of sizes and types of said electrical wire, whereby said cutter spacer defines the distance said cutter edges of said offset cutter wheels are spaced apart so that said cutter edges of said offset cutter wheels flank said central electrical conductor of said electrical wire introduced axially endwise between said offset cutter wheels and said pinch roller cylinder, and only cut into said insulation material of said wire, said cutter edge bevel offsetting the cut further from said central electrical conductor, thus further protecting said central electrical conductor from damage when stripping said insulation material which is blistered or deformed, said slope of said offset cutter wheels assists in shearing said insulation material, said pinch roller stabilizes said wire as it passes through said cutter assembly while said distal end of said diverter finger lifts and deflects any of said insulation material that clings to said O.D. surface of said cutter spacer.

7. A high volume wire stripper stripper of claim 6 wherein the effective angle range of said slope of said offset cutter wheels is between thirty five and fifty five degrees measured from the diametric plane defined by said cutter edge of each said cutter wheel.

* * * * *